No. 612,767. Patented Oct. 18, 1898.
J. J. BUSENBENZ.
COMPOSITE TIRE AND MEANS FOR MANUFACTURING SAME.
(Application filed Feb. 1, 1898.)
(No Model.)
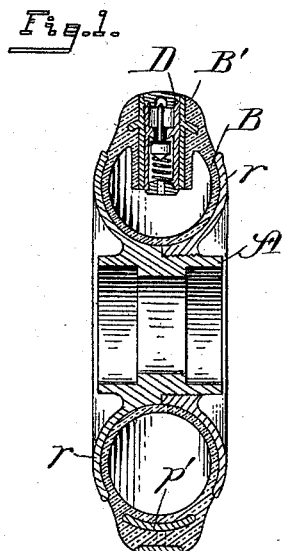
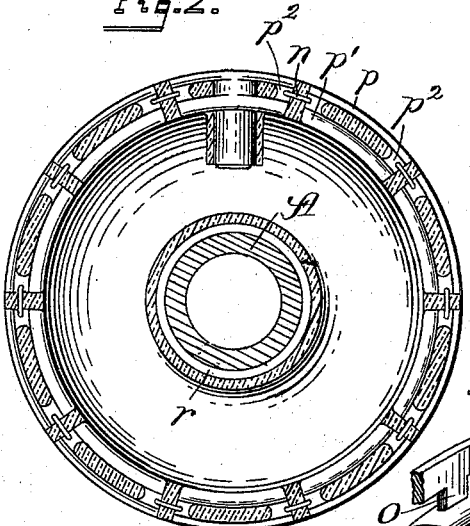
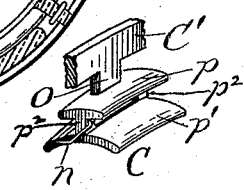
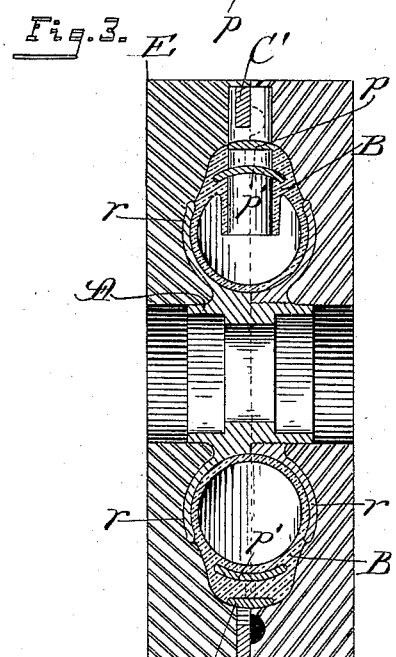
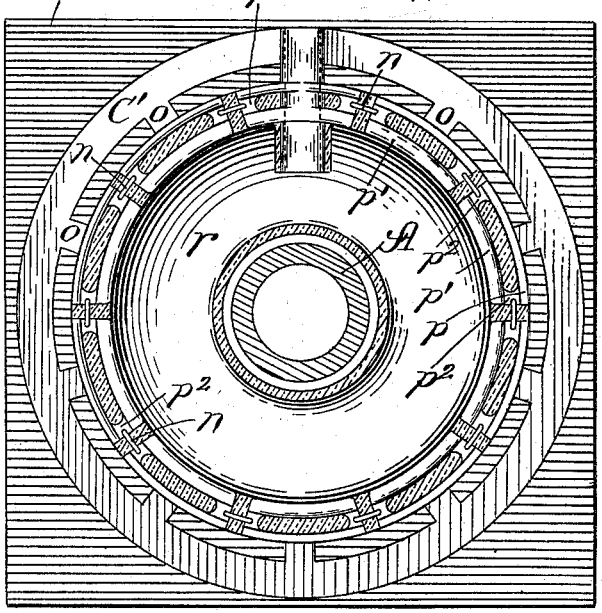
Witnesses:
Ray Hutchins
Ida Crary
Inventor:
Jacob J. Busenbenz
By Dyrenforth and Dyrenforth
Attys.

UNITED STATES PATENT OFFICE.

JACOB J. BUSENBENZ, OF CHICAGO, ILLINOIS.

COMPOSITE TIRE AND MEANS FOR MANUFACTURING SAME.

SPECIFICATION forming part of Letters Patent No. 612,767, dated October 18, 1898.

Application filed February 1, 1898. Serial No. 668,716. (No model.)

*To all whom it may concern:*

Be it known that I, JACOB J. BUSENBENZ, a citizen of the United States, residing at Chicago, in the county of Cook and State of Illinois, have invented a new and useful Improvement in Composite Tires and Means for Manufacturing the Same, of which the following is a specification.

The object of my invention is to provide a novel construction of rubber tire for a roller or wheel particularly for use on roller-skates and the like (though not necessarily limited to such use) which shall possess in a high degree the attributes of durability and speed; and my invention consists in the general as also in the more specific construction of my improved composite tire and of the means I employ in its manufacture.

Referring to the accompanying drawings, Figure 1 is a transverse section of a roller equipped with a pneumatic tire constructed in accordance with my invention; Fig. 2, a horizontal section of the same with the valve removed; Fig. 3, a transverse section of the tired roller as it appears in the mold in which the tire is vulcanized; Fig. 4, a horizontal section of the same, taken at the line 4 on Fig. 3 and viewed in the direction of the arrow; and Fig. 5, a broken perspective view showing one of the metal tread-sections on the centering-ring for carrying them during the vulcanizing operation.

A is the hub, center, or body portion of the roller, formed with a tire-rim $r$, one section of which may be made removable, as represented.

B is a composite pneumatic tire composed of rubber material, such as is commonly employed or suitable for such tires—usually canvas and rubber layers—and a thickened tread portion B', having embedded in it at intervals about its circumference metal (preferably aluminium) sections C, Fig. 5, each composed of an outer tread-plate $p$ and an inner plate $p'$, connected together near their opposite ends by webs $p^2$ $p^2$ to leave a space between the two plates.

To manufacture my improved tire, the rubber tubing prepared for vulcanization is formed about the rim $r$ and the whole is then placed and centered within the circle described by the series of plates $p'$ and $p$, ten of each of which are shown in the illustration. These plates are supported at intervals on a centering-ring C' through the medium of necks $o$, extending radially inward from the inner edge of the ring. The ring C', necks $o$, plates $p$ and $p'$, and their connecting-webs $p^2$ are cast integral with each other out of suitable light metal, preferably aluminium, as hereinbefore stated.

With the roller-body and partially-formed tire thereon thus centered in the plate-carrying ring C' the tread is built up with layers of rubber material, thereby embedding therewith the plates $p$ and $p'$, the latter or inner ones being completely embedded, as also the webs $p^2$, (at which the sections C may be connected from one to the other by links $n$, or not, as desired,) while the outer surfaces of the plates $p$ are left exposed at the periphery of the tread B' to form sections thereof. One of the sections C is provided with coincident openings through the plates $p$ $p'$ to admit the valve D, which is adjusted in the tire through the tread. The tire thus formed on the roller-body A is then adjusted between the two parts of a vulcanizing-mold E, properly shaped to receive the whole, when the vulcanizing operation is performed in the usual or any suitable manner. Thereafter the roller, with the composite tire and ring C' encircling it, is removed from the mold, and the ring, having served its purpose of holding out the sections C, is removed by cutting, as by stamping off the necks $o$ close to the plates $p$, thus leaving the tire in the form in which it is represented in Figs. 1 and 2.

The pneumatic tire thus formed possesses in a high degree the attributes of noiselessness, resiliency, durability, and speed.

What I claim as new, and desire to secure by Letters Patent, is—

1. A composite pneumatic tire having a thickened tread portion built up of rubber material and metal sections embedded therein at intervals about the tread portion, each metal section comprising an inner and an outer plate having a web connection extending between them transversely of the tire, substantially as described.

2. A composite pneumatic tire having a thickened tread portion built up of rubber material and metal sections embedded therein at intervals about the tread portion, each metal section comprising an inner plate and an outer plate having a web connection extending between them transversely of the tire, the outer section being exposed at said tread portion, substantially as described.

3. A composite pneumatic tire having a thickened tread portion built up of rubber material having embedded therein, at intervals about its circumference, metal sections linked together and each comprising a pair of metal plates having a web connection leaving a space between them, substantially as described.

4. A roller comprising, in combination, a body portion A having a rim $r$ and a composite pneumatic tire B on the rim having a tread B' built up of rubber material and metal sections C embedded therein, each formed of a pair of connected plates $p$ and $p'$, substantially as described.

5. In combination, the ring C' having necks $o$ extending from it at intervals about its inner circumference, and sections C carried by said necks and each comprising a pair of web-connected plates $p$ and $p'$, substantially as and for the purpose set forth.

JACOB J. BUSENBENZ.

In presence of—
RAY HUTCHINS,
IDA CRARY.